(12) United States Patent
Goldberg

(10) Patent No.: US 10,637,263 B2
(45) Date of Patent: Apr. 28, 2020

(54) INDUCTIVE CHARGER WITH MECHANICAL, MODULAR, HYGIENIC STAND FOR HAND-HELD APPLIANCES

(71) Applicant: GOBY, New York, NY (US)

(72) Inventor: Benjamin Goldberg, New York, NY (US)

(73) Assignee: GOBY, New York, NY (US)

( * ) Notice: Subject to any disclaimer, the term of this patent is extended or adjusted under 35 U.S.C. 154(b) by 172 days.

(21) Appl. No.: 15/664,112

(22) Filed: Jul. 31, 2017

(65) Prior Publication Data

US 2018/0041058 A1 Feb. 8, 2018

Related U.S. Application Data

(60) Provisional application No. 62/371,487, filed on Aug. 5, 2016.

(51) Int. Cl.
| | | |
|---|---|---|
| *H02J 7/00* | (2006.01) | |
| *H02J 50/10* | (2016.01) | |
| *A61C 17/22* | (2006.01) | |
| *H02J 7/02* | (2016.01) | |

(52) U.S. Cl.
CPC .......... *H02J 7/0042* (2013.01); *A61C 17/224* (2013.01); *H02J 7/0044* (2013.01); *H02J 7/025* (2013.01); *H02J 50/10* (2016.02)

(58) Field of Classification Search
CPC .................................................. H02J 7/0042
USPC ........................................................ 320/108
See application file for complete search history.

(56) References Cited

U.S. PATENT DOCUMENTS

| | | | | |
|---|---|---|---|---|
| 9,356,465 | B2* | 5/2016 | Nazaroff | A61C 17/224 |
| 2009/0010826 | A1* | 1/2009 | Shin | A61L 2/10 |
| | | | | 422/300 |
| 2012/0192367 | A1* | 8/2012 | Lin | A61C 17/224 |
| | | | | 15/22.1 |
| 2013/0125326 | A1* | 5/2013 | Schmid | A46B 9/04 |
| | | | | 15/105 |
| 2015/0145475 | A1* | 5/2015 | Partovi | H01F 5/003 |
| | | | | 320/108 |
| 2016/0134151 | A1* | 5/2016 | Fischer | H02J 7/0044 |
| | | | | 320/108 |

(Continued)

FOREIGN PATENT DOCUMENTS

| | | |
|---|---|---|
| EP | 2868293 A1 | 5/2015 |
| WO | 2010/026528 A2 | 3/2010 |
| WO | WO 2010/026528 A2 | 3/2010 |

OTHER PUBLICATIONS

PCT Search Report for PCT/US 2017/044598, dated Nov. 16, 2017.

(Continued)

*Primary Examiner* — Jerry D Robbins
(74) *Attorney, Agent, or Firm* — FisherBroyles, LLP

(57) ABSTRACT

One or more exemplary embodiments comprise an inductive charging system for charging a rechargeable battery for a handheld appliance, said inductive charging system comprising: (a) an inductive charging shell comprising a power transmitter, a printed circuit board (PCB), at least one charging shell magnet, and a power supply cord; and (b) a handheld appliance comprising a handpiece, wherein within said handpiece is disposed a rechargeable battery, at least one handpiece magnet adapted to attract to the at least one charging shell magnet, and at least one power receiver.

16 Claims, 7 Drawing Sheets

(56) References Cited

U.S. PATENT DOCUMENTS

2017/0105825 A1* 4/2017 Okai ..................... A45D 44/18

OTHER PUBLICATIONS

International Preliminary Report on Patentability issued in relation to corresponding International Patent Application No. PCT/US2017/044598 dated Feb. 5, 2019, 6 pgs.
International Search Report issued in relation to corresponding PCT Application No. PCT/US2017/044598 dated Nov. 16, 2017, 2 pgs.

* cited by examiner

INDUCTIVE CHARGER WITH MECHANICAL, MODULAR, HYGIENIC STAND FOR HAND-HELD APPLIANCES

CROSS-REFERENCE TO RELATED APPLICATION

This application claims priority to U.S. Provisional Patent Application No. 62/371,487, filed Aug. 5, 2016, and entitled "INDUCTIVE CHARGER WITH MECHANICAL, MODULAR, HYGIENIC STAND FOR HAND-HELD APPLIANCES," the entire contents of which are incorporated herein by reference.

INTRODUCTION

A typical electric toothbrush uses rechargeable batteries accommodated within the housing of the toothbrush handpiece. For recharging the batteries of an electric toothbrush, inductive charging is typically used. The handpiece may include a secondary coil extending around a charging recess. The charging recess, which is typically provided in the bottom part of the toothbrush handpiece, is usually pushed onto a thorn-like or mandrel-like charger projection. The charger projection is typically located on a top surface side of a base part and, aside from charging, may serve to hold and store the toothbrush handpiece in an upright position. The charger projection may include a portion of a magnetic core which cooperates with a charger coil in the base part. When the toothbrush handpiece is set atop the base part, the magnetic flux is bundled and transferred to the secondary coil provided in the bottom of the toothbrush handpiece given the secondary coil's proximity to the magnetic core of the base part's charger coil.

Additionally, the base part in typical electric toothbrushes, serving not only to charge but also to hold and store the device, is irreversibly attached to the power supply cord needed to recharge the device. Problematically, this requires the base part's consistent and continual use to recharge the hand-held device. As a result, bases can be unsightly and substantially hinder electric toothbrush mobility, as well as require significant counter space. These bases are a burden to use, store and carry around as needed; they collect residue that is uneasy to clean, are prone to toppling at the slightest touch, and do not transfer as much energy as is desired while charging. Furthermore, the mandrel-like charger projection is not forgiving, requiring precise placement of the device onto the charging base.

Therefore, a method of delivering useful power to a hand-held device, such as an electric toothbrush, that is both efficient and does not distract from the inherent aesthetics and benefits of the device is desired.

It is, therefore, an object of the present description to describe an engaging, multipurpose structure capable of engaging and charging an electric toothbrush with a simple yet innovative configuration. One or more embodiments described herein facilitates greater transfer of energy compared to charging projections of the prior art devices and ensures the option to effortlessly position an electric toothbrush into a separate yet complementary cordless (mechanical), modular and hygienic stand.

In one exemplary embodiment, the electric charging shell, an inductive charger for charging a hand-held appliance, is provided. In another exemplary embodiment, a mechanical, modular and hygienic base for a hand-held appliance, is provided.

One aspect comprises an inductive charging system for charging a rechargeable battery for a handheld appliance, said inductive charging system comprising: (a) an inductive charging shell comprising a power transmitter, a printed circuit board (PCB), at least one charging shell magnet, and a power supply cord; and (b) a handheld appliance comprising a handpiece, wherein within said handpiece is disposed a rechargeable battery, at least one handpiece magnet adapted to attract to the at least one charging shell magnet, and at least one power receiver.

In various exemplary embodiments: (1) the power transmitter comprises at least one transmitting inductive charger coil; (2) the transmitting inductive charger coil surrounds a transmitting magnetic charger projection; (3) the transmitting magnetic charger projection comprises a magnetic ferrite core; (4) the power receiver comprises at least one receiving inductive charger coil; (5) the receiving inductive charger coil surrounds a receiving magnetic charger projection; (6) the receiving magnetic charger projection comprises a magnetic ferrite core; (7) the inductive charging shell is enclosed by a housing; (8) the power supply cord utilizes a Universal Serial Bus ("USB") power source; (9) the power receiver is positioned vertically within the handpiece such that the power receiver is parallel to an upstanding wall of the handpiece; and/or (10) the inductive charging shell housing has a shape that complements or mimics the handpiece.

Another aspect comprises an electronic toothbrush system comprising: (a) an inductive charging system as described above; (b) a brush head; and (c) a stand; wherein the stand comprises a base, a means for attachment of the stand to the inductive charging shell and the handpiece, a baseplate, a drip tray and a drainage hole, wherein the drainage hole is positioned in the baseplate and adapted to enable flow into the drip tray. In an exemplary embodiment, the drip tray is positioned beneath the drainage hole.

Another aspect comprises a method for charging a rechargeable battery for a handheld appliance comprising: (a) providing (i) an inductive charging shell comprising a power transmitter, a printed circuit board (PCB), at least one charging shell magnet, and a power supply cord; and a (ii) a handheld appliance comprising a handpiece, wherein within said handpiece is disposed a rechargeable battery, at least one handpiece magnet adapted to attract to the at least one charging shell magnet, and at least one power receiver; (b) attaching, through magnetic attachment, the inductive charging shell to the handpiece; and (c) providing power through the power cord sufficient to recharge the battery.

These and other features, aspects and advantages of specific embodiments will become evident to those skilled in the art from a reading of the description herein and the appended drawings.

BRIEF DESCRIPTION OF THE DRAWINGS

The present invention will be better understood when considered in view of the attached drawings, in which like reference characters indicate like parts. The drawings, however, are presented merely to illustrate certain exemplary embodiments without limiting the invention in any manner whatsoever.

TABLE 1

Reference Numbers

Figure 1:
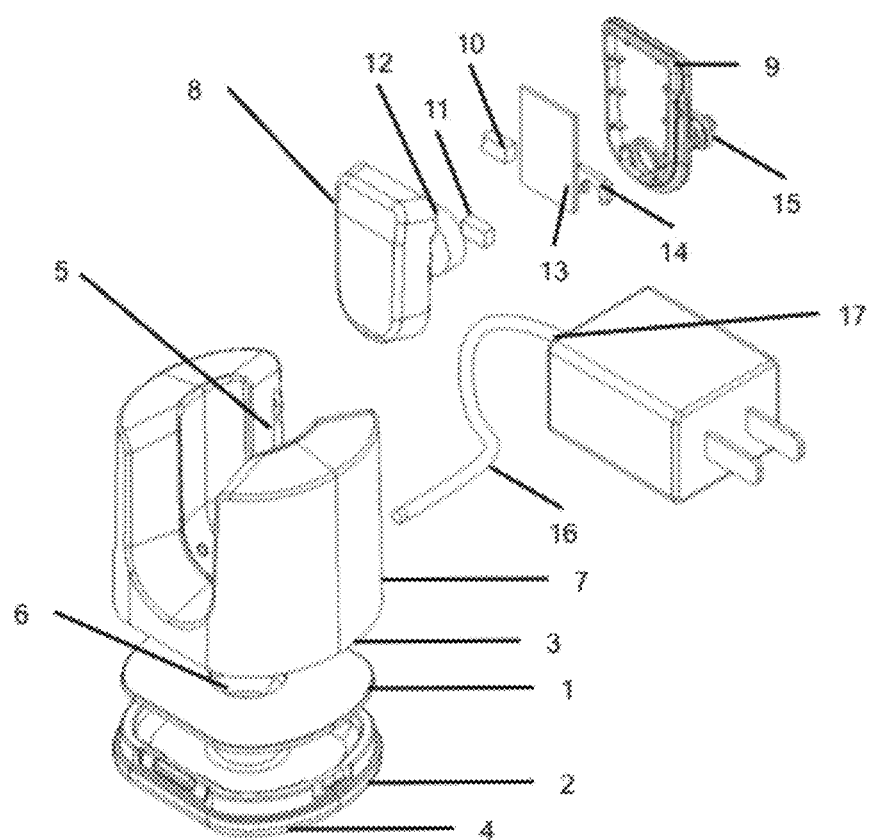
FIG. 1 is an isometric, sectional view of components including internal components of a hand-held device and cooperating inductive charging shell.

| 1 Base Plate | 2 Drip Tray | 3 Stand Weighting | 4 Stand Foot Grips | 5 Grooves/ Insertion Points | 6 Drainage Hole |
|---|---|---|---|---|---|
| 7 Stand | 8 Front Charger Housing | 9 Back Charger Housing | 10 Top Charger Magnet | 11 Bottom Charger Magnet | 12 Transmitting Charger Coil |
| 13 Charger PCB | 14 Strain Relief Fixture | 15 Strain Relief | 16 Power Supply Cord | 17 USB Adaptor | 18 Toothbrush handle |
| 19 Rechargeable battery | 20 Top handheld device magnet | 21 Bottom handheld device magnet | 22 Receiving charger coil | 23 Charging system fixture | 24 Toothbrush head |

DETAILED DESCRIPTION OF SELECT EXEMPLARY EMBODIMENTS

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

In one exemplary embodiment, the electric charging shell, an inductive charger for charging a hand-held appliance, is provided. The charging shell encapsulates and/or shields a power transmitter against environmental influences such as humidity and moisture by means of an insulating cover, wherein the insulating cover may include a molded insulating layer such as an insulating resin and/or molded plastic. The size and shape of the electric charging shell and the electric toothbrush body mimic, or are complementary to one another, allowing for increased efficiency in power transfer.

Since the efficiency of the inductive power transfer is highly dependent upon the distance between the inductive power transmitter and the inductive power receiver, this distance can be minimized by the respective inductive power components being as close together as possible. To maintain consistent and close connection of the inductive power components, magnets are provided at one of the hand-held device and the electric charging shell, and attracting members provided at the other thereof of the handheld device and the electric charging shell, the attracting member being made of a material magnetically attracted to the magnet.

The electric charging shell and the hand-held device may contain inductive power transmitters in the form of one or more inductive charger coils. The inductive charger coils may be surrounding a magnetic ferrite core, the magnetic ferrite core forming at least part of a magnetic charger projection, wherein the charger projection is surrounded by the charger coil which is adapted to electrically connect the charging area on the handpiece and the electric charging shell. The charger coil may be wound around the magnetic core and/or may have direct contact to the peripheral surface of the magnetic core. Additionally, the magnetic core may be made of ferrite and/or may have an elongate shape. The magnetic core may be formed by a copper wire winding around the magnetic projection. Furthermore, the magnetic core and charger coil assembly may be held in place by a supporting body which may be formed as a separate piece.

The electric charging shell may be connected to a power supply cord that utilizes a Universal Serial Bus ("USB") power source. Given less current/voltage is supplied to USB power sources, the USB power source utilized herein makes the charger safer to use. Additionally, the USB power source allows the electric charging shell to be smaller given that a surge protector is not required to be included in the charging device. The USB power source utilized in the electric charging shell, beyond making the device safer and smaller in size, enhances ease-of-use and increases mobility, allowing a user to travel with the electric toothbrush or hand-held device with ease.

In another exemplary embodiment, a mechanical, modular and hygienic stand is provided. This housing serves as the base part for storing the hand-held device when the device is not used, wherein such base part may include a foot surface so that the base part can stand on a table or a bathroom shelf. When the hand-held device is dropped into the stand, the multi-purpose stand cradles the hand-held device into place. The stand engages the handheld device, if it is so desired and preferable, in a substantially upright position.

The stand does not serve as a power supply, and thus its use is not a requirement for charging. As a result, the stand eliminates the need for unsightly cords while engaging the device. The stand may contain grooves that pair with slits along the side of the electric charging shell, allowing for the electric charging shell to seamlessly cooperate with the stand and hand-held device, and for the hand-held device to be engaged simultaneous with charging, if it is so desired and preferable. Thus, the electric toothbrush can be strongly attracted to the mechanical stand due to a vertical force as well as, if paired with the electric charging shell, due to a magnetic force in a magnetizing direction of the magnet in the electric charging shell. As a result, charging or storing or both can be seamlessly and effortlessly completed.

A removable tray is located beneath a drainage hole at the base of the stand to provide for the hiding and easy cleaning of toothpaste and water residue that plagues electric toothbrush users. Typical electric toothbrushes have charging coils on the bottom of the device, which promotes unwanted residue build-up on the device and stand. Given the charging coils of an exemplary embodiment are on the backside and not the bottom of the hand-held device, residue more easily drains into the drainage hole. The drainage hole is located in the center of the base of the stand to enable easy residue flow into the hygienic drip tray. The drainage hole is of a similar diameter to the average adult finger, so as to allow for easy cleaning of the hole. The removable tray, when resting on a solid, non-porous surface, can be firmly pressed and kept in place via a suction cup mechanism. In addition, the removable tray is modular and allows for the inclusion of additional attachments and use cases for the stand, such as additional toothbrush head holder and wall mount.

Hereinafter, select exemplary embodiments are described in detail with reference to the accompanying drawings. In these embodiments, an aspect of the invention is applied to an engaging structure of an electric toothbrush with a separate yet complementary and cooperating inductive charger, the inductive charger at least serving to charge the electric toothbrush attached thereat.

As shown in the drawings, the inductive charger may be part of an electric charging shell 8 that may be inserted into a hygienic, modular stand 7 and therefore store the hand-held appliance when not in use. The hand-held appliance can be an electric toothbrush, which includes a handpiece to which a brush head or other attachments such as interdental cleaners may be attached. Other alternative products to which the invention may apply include shavers, body hair removers or other hand-held appliances which include rechargeable batteries for powering functional components of the appliance.

In an electric toothbrush, the functional powering includes the means for driving the brush head of the toothbrush, wherein the rechargeable batteries 19 are accommodated within the housing of the handpiece. To allow inductive charging of the rechargeable batteries, the handpiece of the hand-held appliance may include a receiving charging coil 22 located on the backside of the hand-held device. The charging coil may be held into place by a charging system fixture 23 located inside the toothbrush handpiece. So as to attract the electric charging shell to the handpiece of the hand-held device, one or more magnets 20, 21 are located around the charging coil. Attracting members 10, 11 are provided at the electric charging shell, being made of a material magnetically attracted to the magnets provided in each the electric charging shell and the hand-held device.

The electric charging shell forms a charger projection onto which the handpiece may be attached to inductively charge the rechargeable battery 19 located in the handpiece of the device. The charging shell contains a transmitting charging coil 12 that serves as an inductive power transmitter, that when attached to the receiving charging coil in the hand-held device, serve to recharge the rechargeable batteries in the hand-held device.

The charging coil in the electric charging shell is surrounded by charger housing 8 9, preferably made from a plastic or resin-like material. The size and shape of the electric charging shell housing and the electric toothbrush body mimic one another, allowing for increased efficiency in power transfer.

The electric charging shell also contains a charger Printed Circuit Board ("PCB") 13, a flat insulating sheet to which an electronic circuit consisting of thin strips of a conducting material such as copper have been etched. The PCB is connected to a power supply cord 16 that utilizes a Universal Serial Bus ("USB") 17 power source. The electric charging shell contains a strain relief fixture 14 and strain relief 15 so as to firmly connect the power supply cord to the charging shell.

In FIG. 1, a mechanical, modular, hygienic stand 7 is provided. This housing serves as the base part for storing the hand-held device when the device is not used, wherein such base part may include a foot surface 4 so that the base part can stand on a table or a bathroom shelf. When the hand-held device is dropped into the stand, the multi-purpose stand cradles the hand-held device into place. The stand engages the handheld device, if it is so desired and preferable, in a substantially upright position.

The stand may contain grooves 5 that pair with slits along the side of the electric charging shell, allowing for the electric charging shell to seamlessly cooperate with the stand, and allowing for the hand-held device to be engaged simultaneous with charging, if it is so desired and preferable. A removable tray 2 is located beneath a drainage hole 6 at the base of the stand to collect toothpaste and water residue.

Figure 2:
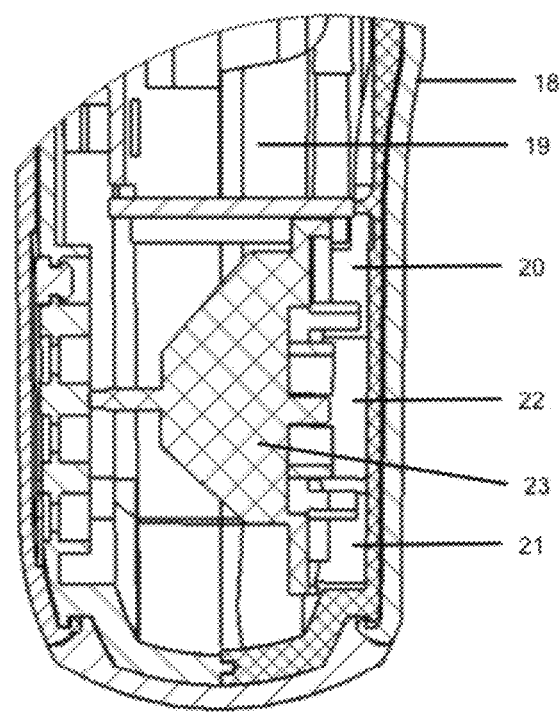
FIG. 2 is a side interior sectional view of the handle of a hand-held device.

FIG. 2 is a side interior sectional view of the handle of a hand-held device.

Figure 3:
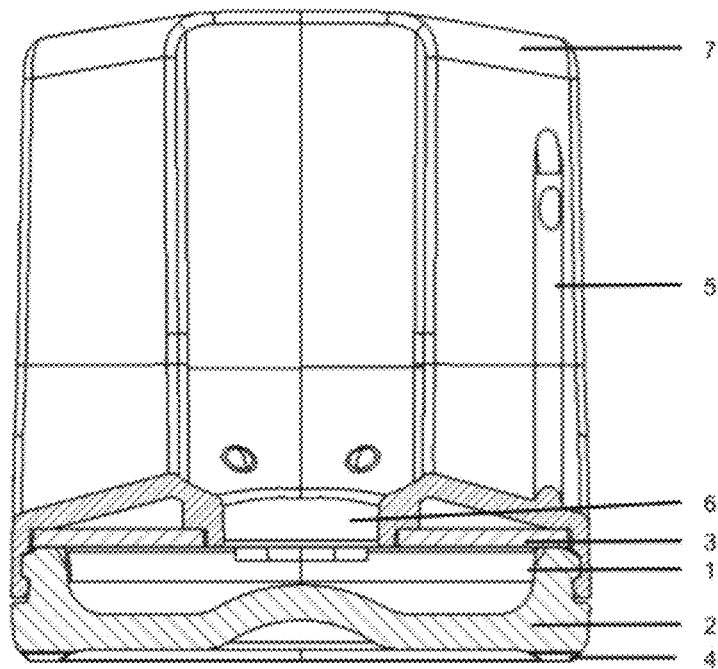
FIG. 3 is a side sectional view of the mechanical, modular, hygienic stand that engages the hand-held device shown in FIG. 2.

FIG. 3 is a side sectional view of the mechanical, modular, hygienic stand that engages the hand-held device shown in FIG. 2.

Figure 4:
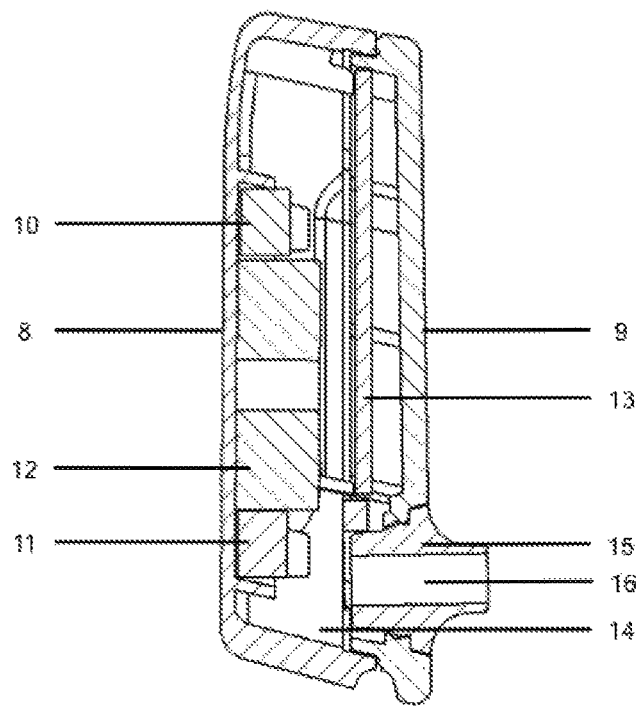
FIG. 4 is a side sectional view of the inductive charging shell that cooperates and connects with the hand-held device shown in FIG. 2.

FIG. 4 is a side sectional view of the inductive charging shell that cooperates and connects with the hand-held device shown in FIG. 2.

Figure 5:
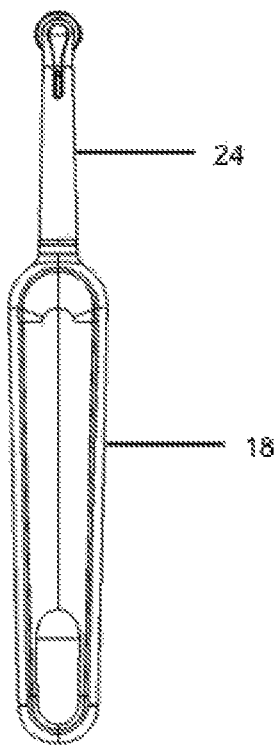
FIG. 5 is a rear view of the hand-held device showing the area of the device that connects with the charging shell shown in FIG. 4.

FIG. 5 is a rear view of the hand-held device showing the area of the device that connects with the charging shell shown in FIG. 4.

Figure 6:
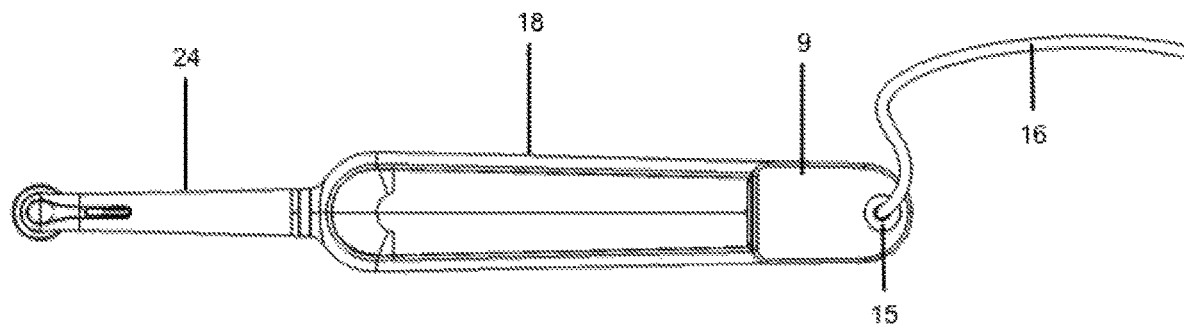
FIG. 6 is a rear view of the hand-held device with the charging shell as shown in FIG. 4 connected.

FIG. 6 is a rear view of the hand-held device with the charging shell as shown in FIG. 4 connected.

Figure 7:
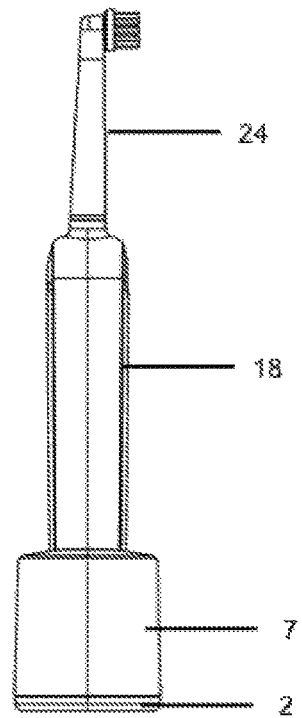
FIG. 7 is a side view of the hand-held device engaged in the mechanical, modular, hygienic stand as shown in FIG. 3.

FIG. 7 is a side view of the hand-held device engaged in the mechanical, modular, hygienic stand as shown in FIG. 3.

Figure 8:
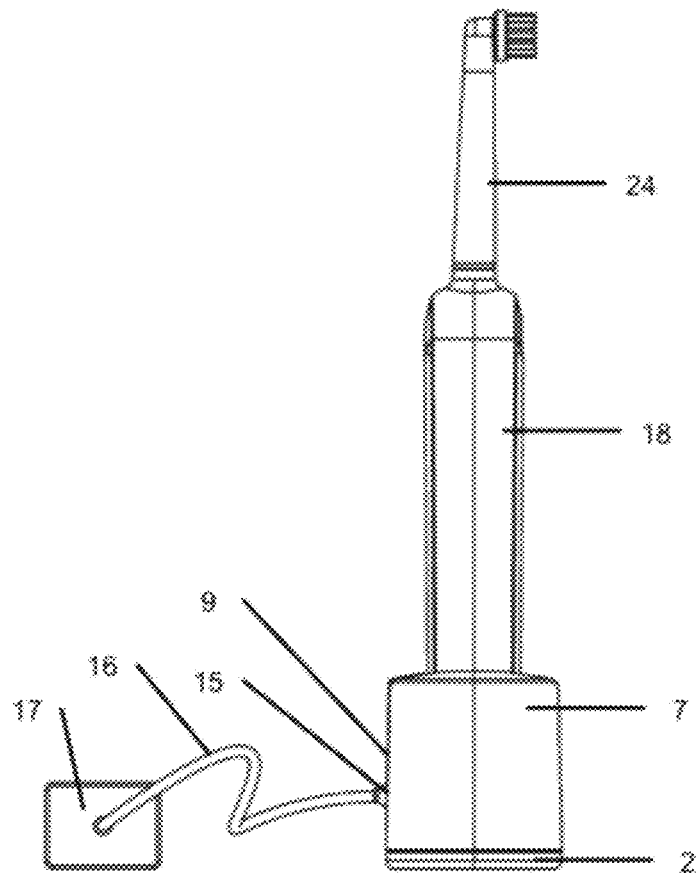
FIG. 8 is a side view of the hand-held device engaged in the mechanical, modular, hygienic stand as shown in FIG. 3 that is cooperating and connected with the charging shell as shown in FIG. 4.

FIG. 8 is a side view of the hand-held device engaged in the mechanical, modular, hygienic stand as shown in FIG. 3 that is cooperating and connected with the charging shell as shown in FIG. 4.

Figure 9:
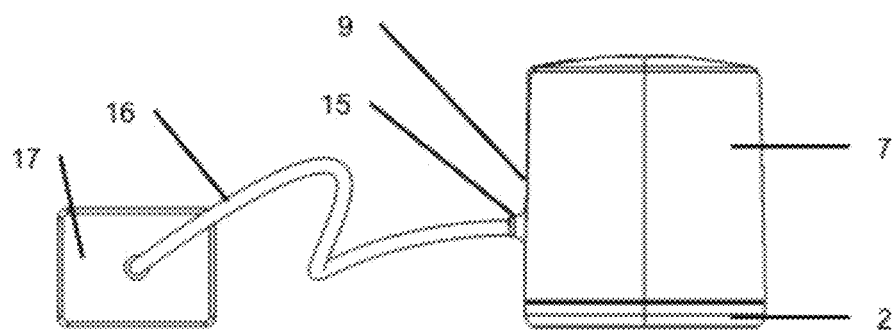
FIG. 9 is a side view of the mechanical, modular, hygienic stand as shown in FIG. 3 and the cooperating charging shell as shown in FIG. 4.

FIG. 9 is a side view of the mechanical, modular, hygienic stand as shown in FIG. 3 and the cooperating charging shell as shown in FIG. 4.

Figure 10:
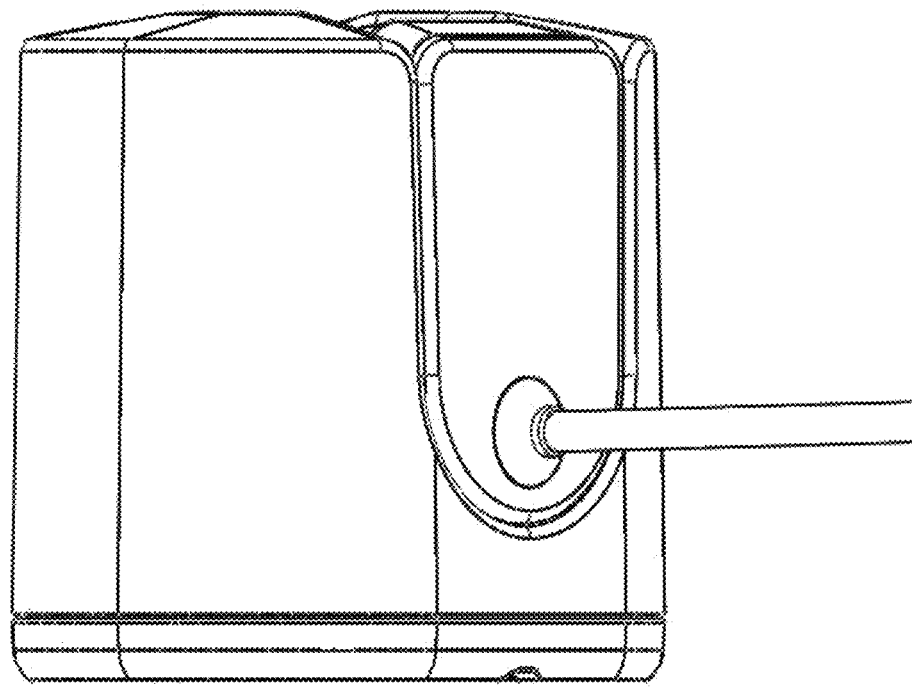
FIGS. 10 and 11 further illustrate the charging shell being connected to and separated from the base.
Figure 11:
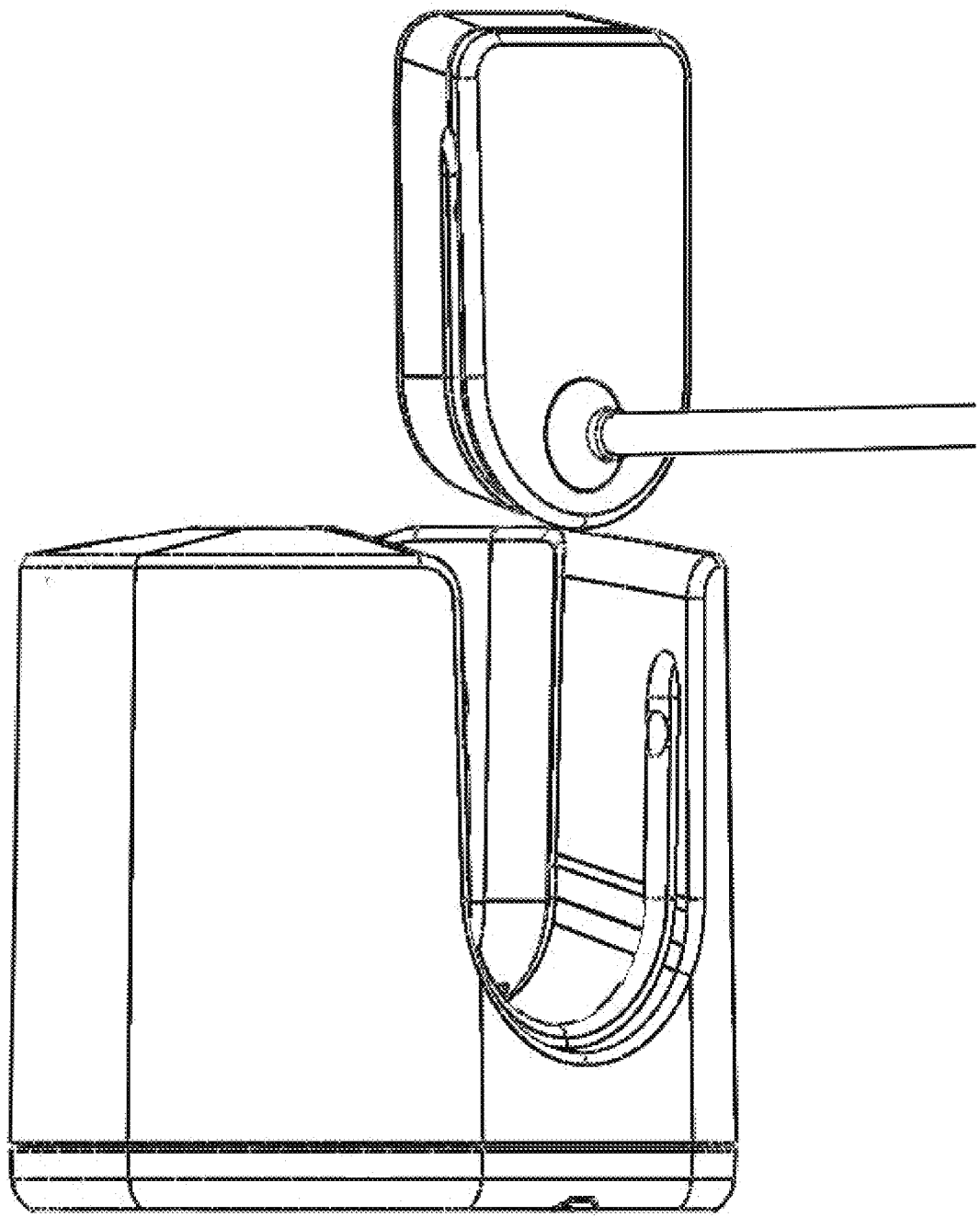

FIGS. 10 and 11 further illustrate the charging shell being connected to and separated from the base.

The dimensions and values disclosed herein are not to be understood as being strictly limited to the exact numerical values noted. Unless otherwise specified, each dimension is intended to mean both the noted value and an equivalent range surrounding the value. For example, a dimension noted as "60 mm" is intended to mean "about 60 mm."

Every document cited herein, including any cross referenced or related patent or application, is hereby incorporated herein by reference in its entirety unless expressly excluded or otherwise limited, The citation of any document is not an admission that it is prior art with respect to any invention disclosed or claimed herein or that it alone, or any combination with any other reference or references, teaches, suggests, or discloses any such invention. Further, to the extent conflicts with any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A system comprising:
   (a) an inductive charging shell comprising a power transmitter, a printed circuit board (PCB), at least one charging shell magnet, and a Universal Serial Bus (USB) power supply cord;
   (b) a magnetically separable handheld appliance comprising a handpiece, wherein within said handpiece is disposed a rechargeable battery, at least one handpiece magnet adapted to attract to the at least one charging shell magnet to magnetically attach the handheld appliance to the inductive charging shell, and at least one power receiver that inductively couples to the power transmitter of the inductive charging shell to receive power from the inductive charging shell; and
   (c) a mechanically separable stand that mechanically retains both the handpiece and the inductive charging shell housing via grooves in the stand when the inductive charging shell is magnetically attached to the handheld appliance, said stand comprising drainage that collects residue from the handheld appliance,
   wherein the inductive charging shell and the handheld appliance are operable to be removed from the stand and used without the stand during travel.

2. The inductive charging system according to claim 1, wherein the power transmitter comprises at least one transmitting inductive charger coil.

3. The inductive charging system according to claim 2, wherein the transmitting inductive charger coil surrounds a transmitting magnetic charger projection.

4. The inductive charging system according to claim 3, wherein the transmitting magnetic charger projection comprises a magnetic ferrite core.

5. The inductive charging system according to claim 1, wherein the power receiver comprises at least one receiving inductive charger coil.

6. The inductive charging system according to claim 5, wherein the receiving inductive charger coil surrounds a receiving magnetic charger projection.

7. The inductive charging system according to claim 6, wherein the receiving magnetic charger projection comprises a magnetic ferrite core.

8. The inductive charging system according to claim 1, wherein the inductive charging shell is enclosed by a housing.

9. The handheld appliance according to claim 1, wherein the power receiver is positioned vertically within the handpiece such that the power receiver is parallel to an upstanding wall of the handpiece.

10. The handheld appliance according to claim 8, wherein the inductive charging shell housing has a shape that corresponds to the external shape of the portion of the handpiece adjacent to the charging shell housing.

11. The inductive charging system according to claim 1, further comprising a separate stand that accepts both the handpiece and the inductive charging shell housing.

12. An electronic toothbrush system comprising:
   an inductive charging system comprising a Universal Serial Bus (USB) power supply cord;
   a magnetically separable electric toothbrush handpiece that is adapted to attract to at least one magnet of the inductive charging system to magnetically attach the electric toothbrush handpiece to the inductive charging system such that the handpiece inductively couples to the inductive charging system to receive power from the inductive charging system; and
   a stand that retains both the electric toothbrush handpiece and the inductive charging system via grooves in the stand when the inductive charging system is magnetically attached to the electric toothbrush handpiece, wherein the stand mechanically separates from the inductive charging system and the electric toothbrush handpiece when the inductive charging system and the electric toothbrush handheld are to be used without the stand during travel;
   wherein the stand comprises a base configured to mechanically accept the electric toothbrush handpiece and the inductive charging system in a manner that enables charging of the handpiece by the inductive charging system and that mechanically retains both the handpiece and the inductive charging system, said stand comprising drainage that collects residue from the handheld appliance.

13. The electronic toothbrush system according to claim 12, wherein the base comprises a baseplate, a removable drip tray, and a drainage hole.

14. The electronic toothbrush system according to claim 13, wherein the drainage hole is positioned in the baseplate and adapted to enable flow into the drip tray.

15. The electronic toothbrush system according to claim 13, wherein the drip tray is positioned beneath the drainage hole.

16. A method comprising:
   magnetically attaching an inductive charging shell to a handheld appliance, wherein the inductive charging shell comprises a Universal Serial Bus (USB) power supply cord, and at least one magnet operable to magnetically attach the inductive charging shell to the handheld appliance, and wherein the handheld appliance comprises a rechargeable battery operable to receive power from the inductive charging shell;
   mechanically attaching the inductive charging shell and the handheld appliance to a stand via grooves in the stand when the inductive charging shell is magnetically attached to the handheld appliance;
   inductively powering the rechargeable battery in the handheld appliance via the inductive charging shell when the inductive charging shell receives power via the USB power supply cord; and removing the inductive charging shell and the handheld appliance for operation during travel.

\* \* \* \* \*